United States Patent
Judd

(10) Patent No.: US 7,464,322 B2
(45) Date of Patent: *Dec. 9, 2008

(54) SYSTEM AND METHOD FOR DETECTING WRITE ERRORS IN A STORAGE DEVICE

(75) Inventor: Ian David Judd, Winchester (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/047,368

(22) Filed: Mar. 13, 2008

(65) Prior Publication Data

US 2008/0184062 A1 Jul. 31, 2008

Related U.S. Application Data

(63) Continuation of application No. 10/839,106, filed on May 5, 2004, now Pat. No. 7,380,198.

(30) Foreign Application Priority Data

Jun. 11, 2003 (GB) .................. 0313419.4
Jun. 27, 2003 (GB) .................. 0315063.8

(51) Int. Cl.
*G11C 29/00* (2006.01)
*G11C 7/00* (2006.01)
*H03M 13/00* (2006.01)

(52) U.S. Cl. ........................ 714/766; 714/758; 714/723; 365/201

(58) Field of Classification Search ................ 714/766, 714/758, 723, 201, 200
See application file for complete search history.

(56) References Cited

U.S. PATENT DOCUMENTS 5,455,942 A * 10/1995 Mohan et al. ............... 707/202

OTHER PUBLICATIONS

IBM Technical Disclosure Bulletin NB83045889 "Partial Data Page Write Detection" vol. 25 Issue 11B p. 5889 Publication Date Apr. 1, 1983 (19830401).*

* cited by examiner

*Primary Examiner*—Cynthia Britt
(74) *Attorney, Agent, or Firm*—Dillon & Yudell LLP

(57) ABSTRACT

A system for detecting write errors in a storage device is disclosed. The system includes a storage device having means for storing one or more data blocks in a storage group. The storage group includes one or more data blocks and a check block having one of the group of: a combination of the one or more data blocks of the storage group, a combination of one or more bits of a logical block address associated with the storage group, and a combination of one or more bits of a phase field that is updated each time the storage group is written. The system also includes means for updating the check block each time the storage group is written, and means for detecting write errors by checking the check block when a storage group is read.

16 Claims, 2 Drawing Sheets

SYSTEM AND METHOD FOR DETECTING WRITE ERRORS IN A STORAGE DEVICE

This present application is a continuation of U.S. patent application Ser. No. 10/839,106, filed on May 5, 2004 now U.S. Pat. No. 7,380,198, entitled "System and Method for Detecting Write Errors in a Storage Device" and also claims priority to the subject matter of GB Patent Application No. 0315063.8, Filed Jun. 27, 2003; entitled "Memory Devices". The contents of the above-referenced applications are incorporated herein. This application is also related to U.S. application Ser. No. 10/839,691, entitled "Method and System for Correcting Errors in a Memory Device" filed concurrently herewith.

BACKGROUND OF THE INVENTION

1. Technical Field

This invention relates to storage systems and particularly to disk storage systems for electronic data storage.

2. Description of the Related Art

Due to advances in recording technology, the capacity of hard drives is doubling annually. The areal density is shortly expected to reach 100 Gbits per square inch and a 3.5" drive will be capable of storing 300 GB.

The reliability of a hard drive is specified in terms of its MTBF and the unrecoverable error rate. Typical specifications for current server-class drives are 1,000,000 hours and 1 unrecoverable error in $10^{15}$ bits read. However, increases in areal density make it harder to maintain reliability due to lower flying heights, media defects, etc.

RAID (Redundant Array of Independent Disks) arrays (e.g., RAID-1 or RAID-5) are often used to further improve the reliability of storage systems. However with high-capacity drives a single level of redundancy is no longer sufficient to reduce the probability of data loss to a negligible level.

It is also possible for a disk drive to occasionally return erroneous data on a read command because a previous write command has not written to the correct location on the recording medium or it failed to record on the medium at all. This may be due to an intermittent hardware failure or a latent design defect. For example, the drive might write the data to the wrong LBA (Logical Block Address) due to a firmware bug, or it may write off track, or it may fail to write at all because a drop of lubricant (commonly referred to as 'lube') lifts the head off the disk surface.

There is increasing interest in using commodity drives such as Advanced Technology Attachment (ATA) drives in server applications because they are about 3 times cheaper in terms of cents/MB. However these drives were originally intended for intermittent use in PC's and so they may be less reliable than server-class drives. Also ATA drives only support 512-byte blocks and so block-level LRC (Longitudinal Redundancy Check) cannot be used to detect data corruption.

For a single disk drive the controller could read back each block and verify it just after it has been written.

Any type of redundant RAID (Redundant Array of Independent Disks) array could be implemented in a way that allows the read data to be checked. For example, with a RAID-5 array the controller could check that the read data is consistent with the other data drives and the parity drive.

However, these approaches have the disadvantage that both methods drastically reduce the overall throughput in terms of I/O (Input/Output) commands per second, since the first method requires an extra revolution and the second method requires several drives to be accessed for each read command).

A need therefore exists for detection of write errors in a storage system wherein the above mentioned disadvantage may be alleviated.

SUMMARY OF THE INVENTION

In accordance with a preferred embodiment of the present invention, a system for detecting write errors in a storage device includes a storage device having means for storing one or more data blocks in a storage group. The storage group includes one or more data blocks and a check block having one of the group of: a combination of one or more data blocks of the storage group, a combination of one or more bits of a logical block address associated with the storage group, and a combination of one or more bits of a phase field that is updated each time the storage group is written. The system also includes means for updating the check block each time the storage group is written, and means for detecting write errors by checking the check block when a storage group is read.

BRIEF DESCRIPTION OF THE DRAWINGS

One system and method for detection of write errors in a storage system by using a phase field incorporating the present invention will now be described, by way of example only, with reference to the accompanying drawings, in which.

DETAILED DESCRIPTION OF A PREFERRED EMBODIMENT

Briefly stated, in its preferred embodiment this invention uses interleaved parity blocks containing a phase field (e.g., a single bit flag) to detect nearly all instances of data corruption by a disk drive. The parity blocks also provide an additional level of error correction. These features are particularly useful for ATA drives since they tend to have a higher uncorrectable error rate than server drives. (ATA drives typically specify a hard error rate of 1 in $10^{14}$ bits and so the chance of a 100 GB drive containing a block with a hard read error is 0.8%. If these drives are then used to build a 10+P RAID-5 array the chance of a rebuild failing after replacing a drive is 8%.)

Figure 1:
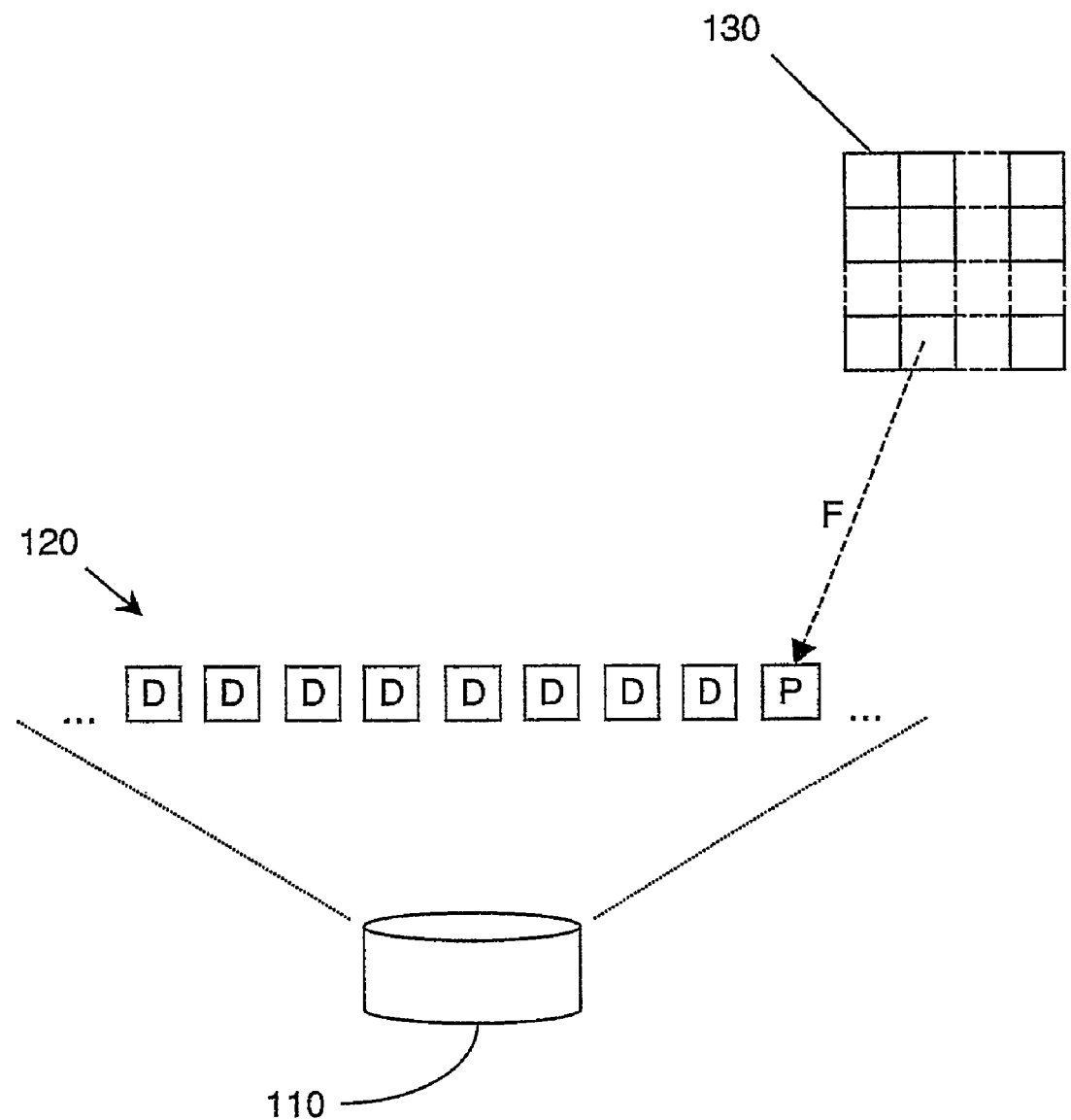
FIG. 1 shows a block schematic diagram of a disk drive storage system incorporating the invention.

Referring now to FIG. 1, a magnetic disk storage system 100 includes a disk 110, in which information is stored in blocks D and P of, typically, 512 bytes each. When storing data on disk one parity block P is inserted following every N data blocks, e.g. as shown, every eight 512-byte blocks or 4 KB. These N+1 blocks are considered a group 120. Consequently the effective data capacity of the drive is reduced by N/(N+1).

Figure 2:
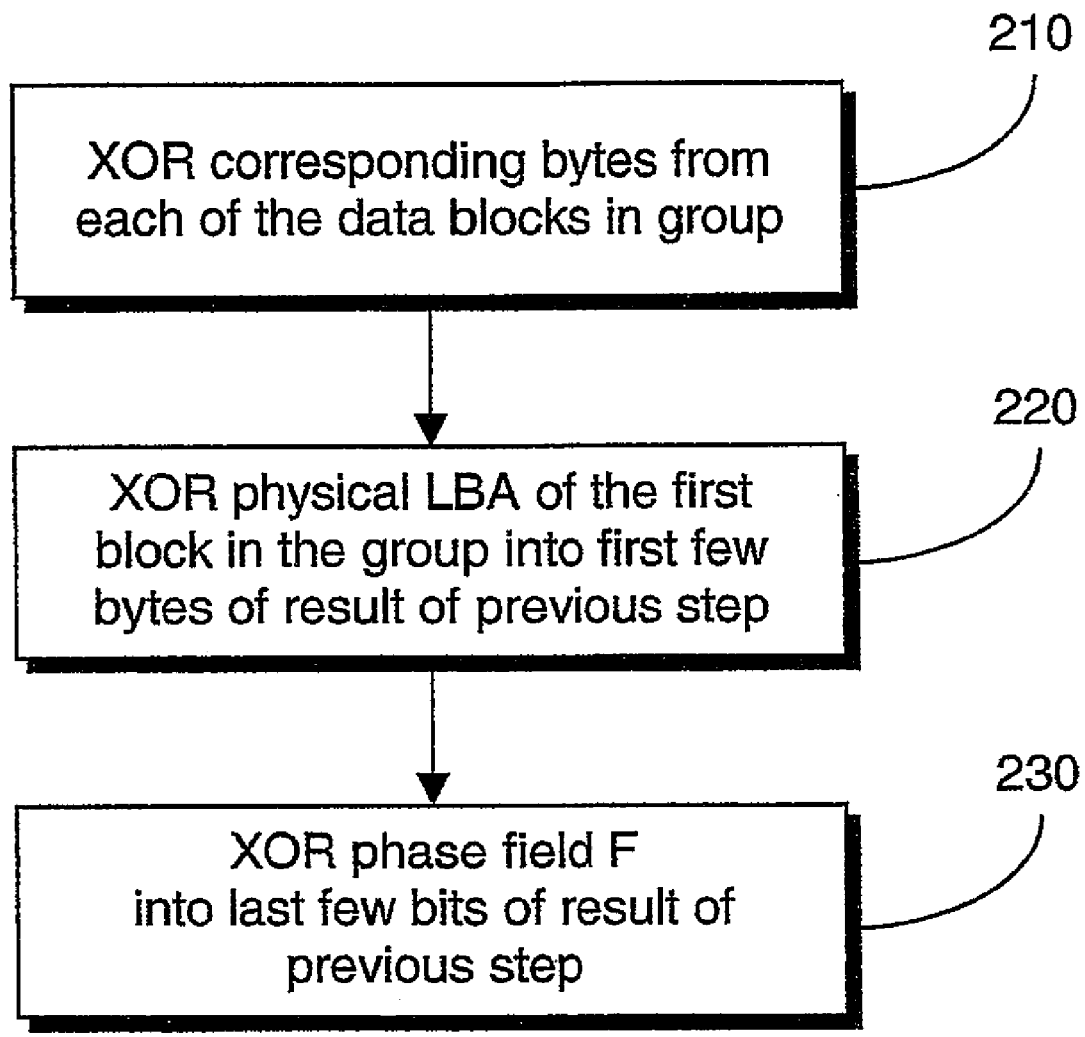
FIG. 2 shows a block schematic diagram of a method for computing a parity block using the system of FIG. 1.

As illustrated in FIG. 2, the parity block P contains the group parity which is computed as follows:

At Step 210, the system performs an XOR operation of corresponding bytes from each of the data blocks in that group.

At Step 220, the system performs an XOR operation of the physical LBA of the first block in the group into the first few bytes of the result of step 210. This LBA seed allows detection of addressing errors on nearly all reads and some writes.

At Step 230, the system performs an XOR of a phase field F into the last few bits of the result of step 220. The phase field F may be a single bit value which is inverted each time the group is written. Alternatively it may be a multi-bit counter which is updated (e.g., incremented) each time the group is written. The phase field detects most of the remaining addressing errors on writes.

Except when the drive encounters an unrecoverable read error, the disk controller (not shown) reads and writes the drive in complete groups. It performs the computation above for each group. For a write, the result is written to the parity block. For a read, the result is XOR'ed with the contents of the read parity block and if the result is non-zero then there is an error in that group.

The parity blocks P allow the controller to handle the following drive errors:

If the drive encounters an unrecoverable medium error in one data block of a group, the controller restarts the read at the next block. It then reconstructs the missing block by using the group parity, assuming that the LBA and phase are correct. Finally it reassigns the bad LBA and rewrites the block.

If the drive reads the wrong LBA, the group parity check will be non-zero because of the LBA seed. The controller then retries the read once and returns a medium error if the parity fails again.

If the drive has previously written the wrong LBA, or the medium was not written at all and the host then submits a request to read the correct LBA, the group parity check will be non-zero because of the phase field F. The controller then retries the read once and returns a medium error if the parity fails again.

If the drive has previously written the wrong LBA and the host then submits a request to read the incorrect LBA, the group parity check will be incorrect because of the LBA seed. The controller retries the read once and returns a medium error if the parity fails again.

When the controller returns a medium error the data can still be recovered if the drive is a component of a redundant array (not shown).

Since the controller always reads and writes a complete group on disk, short or unaligned writes require a read-modify-write. However, RAID-5 has a similar penalty, and there is no additional overhead in this case.

The disk controller must store the current phase of each group in a non-volatile table 130. For example, when using a single-bit phase flag the resulting bit map occupies about 2.6 MB for a 100 GB drive with 4 KB groups. The controller initializes all of the phase flags to zero when the drive is formatted. The phase flag bit map 130 may be implemented in various ways. Flash memory is not directly suitable because it would wear out rapidly if the same group is written repeatedly. Battery-backed SRAM's (Static Random Access Memories) would be bulky and expensive. A preferred solution is to store the bit map in a reserved area of the disk drive and cache a working copy in SDRAM (Synchronous Dynamic Random Access Memory) in the controller. However, to avoid updating the reserved area for every write command, the changes must be batched up in some way and protected from power failure and resets.

In addition, if a disk write is interrupted by a power failure or a drive reset then the state of the phase flag on disk is in doubt. This must not cause a subsequent read to fail with a medium error, since there is nothing wrong with the drive. (However it is acceptable to return old data, new data or a mixture of the two since the controller has not completed the write to the host.)

These two problems can be solved by making an entry in a non-volatile log just before issuing a disk write, and deleting (or invalidating) it when the write completes. The same log can also be used to retain updates to the bit map in SDRAM which have not yet been flushed to disk. A typical log entry requires 8 bytes.

Bytes 0-3 will typically contain the address of first Group to be written.

Bytes 4-5 will typically contain number of consecutive Groups to be written. (Non-zero, which indicates a valid log entry.)

Byte 6 will typically be initialized to FFh (the 'h' suffix denoting hexadecimal notation). Set to 00h after the disk write completes.

Byte 7 will typically be initialized to FFh. Set to 00h after the bit map has been updated on disk.

The log can be stored in a small battery-backed SRAM, i.e., NVRAM (Non-Volatile RAM).

In some implementations it may be convenient to store the log in additional sectors of the flash memory that contains the controller code. When a log sector has been completely used it is erased to all FFh. A word write to flash typically takes about 500 μs and each disk write requires 3 flash writes. This allows nearly 700 disk writes per second. Wear on the flash memory is automatically evened out since the log is written sequentially. Also the log entries are formatted so that each byte is written only once per disk write. For example, 1 MB of flash with an endurance of $10^5$ cycles would last over 4 years at 100 disk writes per second.

To ensure high-availability, storage systems often employ dual (active-active) controllers. In this environment it is desirable to maintain mirror copies of the non-volatile log in each controller. This ensures that the protection provided by the phase fields will not be lost if a controller fails. The two logs must be kept in sync by exchanging messages between the controllers. Each controller must inform the other controller to update its log before it writes a group to disk and again when the write completes. However, in practice this will typically not be a big overhead because higher-level functions such as RAID-5 exchange similar messages.

A means must also be provided to resynchronize the two controllers, e.g. if one of the controllers is replaced after a failure. This is most easily achieved by flushing the outstanding updates out to disk from the log in the remaining controller and clearing the log in the replacement controller.

It will be understood that the scheme for detection of write errors in a storage system by using phase flags described above provides the following advantages: Improved data integrity is expected. The scheme is particularly useful when using low-cost desk-top drives. These are normally limited to 512-byte blocks and so there is no room to store a check field in each block. However, it could also be applied to server-class drives. Low performance impact, especially when used in conjunction with RAID-5 (no additional disk accesses are needed to check the read data) is expected.

In the simplest case the phase field is a single bit which is inverted on each write to a group. However for better protection it could also be a multi-bit counter which is updated, for example, incremented by a positive or negative value (i.e., decremented).

It will be appreciated that the method described above for detection of write errors in a storage system will typically be carried out in software running on a processor (not shown) within the system, and that the software may be provided as a computer program element carried on any suitable data carrier (also not shown) such as a magnetic or optical computer disk.

It will also be understood that although the invention has been described above in the context of a magnetic disk storage system, the invention may be alternatively be applied to other storage systems such as those based on optical disks or magnetic tape.

What is claimed is:

1. A system for detecting write errors in a storage device, said system comprising:
   a storage device;
   within said storage device, means for storing one or more data blocks in a storage group, said storage group including said one or more data blocks and a check block, wherein said check block includes one of the group of:
      a combination of said one or more data unlocks of said storage group,
      a combination of one or more bits of a logical block address associated with said storage group, and
      a combination of one or more bits of a phase field that is updated each time said group is written;
   means for updating said check block each time said group is written; and
   means for detecting write errors by checking said check block when a group is read.

2. The system of claim 1, wherein said combination is a logical Exclusive-OR combination.

3. The system of claim 1, wherein said phase field comprises a single bit value, which single-bit value is inverted each time the group is written.

4. The system of claim 1, wherein said phase field comprises a multi-bit value, which multi-bit value is updated each time said group is written.

5. The system of claim 1, further comprising:
   a non-volatile table for the expected phase field values, wherein said table comprises a reserved disk area within said storage device; and
   a working copy of said table cached in a controller of said system.

6. The system of claim 5, further comprising a non-volatile log, said log arranged to record an entry before a write operation.

7. The system of claim 6, wherein said log is arranged to retain updates to a working copy of said table in said controller, which updates have not yet been stored in said non-volatile table.

8. The system of claim 1, further comprising a non-volatile log, said log arranged to record an entry before a disk write operation starts, said entry being arranged for an operation selected from the group of (1) invalidation or (2) deletion on completion of the write operation.

9. A computer program product in a computer-readable medium for detecting write errors in a storage device, said computer program product comprising:
   a computer-readable medium;
   instructions on the computer-readable medium for storing one or more data blocks in a storage group, said storage group comprising said one or more data blocks and a check block, wherein said check block includes one of the group of:
      a combination of said one or more data blocks of said storage group,
      a combination of one or more bits of a logical block address associated with said storage group, and
      a combination of one or more bits of a phase field that is updated each time said storage group is written;
   instructions on the computer-readable medium for updating said check block each time said storage group is written; and
   instructions on the computer-readable medium for detecting write errors by checking said check block when a group is read.

10. The computer program product of claim 9, wherein said storing instructions further comprise instructions for creating said check block to include a combination that is a logical Exclusive-OR combination.

11. The computer program product of claim 9, wherein said storing instructions further comprise instructions for creating said check block to include a phase field that comprises a single bit value, which single-bit value is inverted each time the group is written.

12. The computer program product of claim 9, wherein said storing instructions further comprise instructions for creating said check block to include a phase field, which comprises a multi-bit value, which multi-bit value is updated each time said group is written.

13. The computer program product of claim 9, further comprising instructions on the computer-readable medium for:
   creating a non-volatile table for the expected phase field values, wherein said table comprises a reserved disk area within said storage device; and
   generating a working copy of said table cached in a controller of said system.

14. The computer program product of claim 13, further comprising instructions on the computer-readable medium for recording a non-volatile log, said log arranged to record an entry before a disk write operation starts.

15. The computer program product of claim 14, wherein said instructions for recording said log further comprise instructions for arranging said log to retain updates to a working copy of said table in said controller, which updates have not yet been stored in said non-volatile table.

16. The computer program product of claim 9, further comprising instructions on the computer-readable medium for generating a non-volatile log, wherein said log is arranged to record an entry before a write operation, said entry being arranged for an operation selected from the group of (1) invalidation or (2) deletion on completion of the write operation.

* * * * *